United States Patent
Noréus et al.

(10) Patent No.: US 7,056,397 B2
(45) Date of Patent: Jun. 6, 2006

(54) METHOD FOR IMPROVING THE PROPERTIES OF ALLOY POWDERS FOR NIMH BATTERIES

(75) Inventors: Dag Noréus, Saltsjö-Duvnäs (SE); Ye Zhou, Höganäs (SE)

(73) Assignee: Höganäa Ab, Höganäa AB (SE)

( * ) Notice: Subject to any disclaimer, the term of this patent is extended or adjusted under 35 U.S.C. 154(b) by 142 days.

(21) Appl. No.: 10/275,158

(22) PCT Filed: May 16, 2001

(86) PCT No.: PCT/SE01/01103

§ 371 (c)(1),
(2), (4) Date: Nov. 4, 2002

(87) PCT Pub. No.: WO01/89009

PCT Pub. Date: Nov. 22, 2001

(65) Prior Publication Data

US 2003/0075015 A1    Apr. 24, 2003

(30) Foreign Application Priority Data

May 17, 2000  (SE) .................................. 0001835

(51) Int. Cl.
*C21D 10/00*    (2006.01)

(52) U.S. Cl. .................................................... 148/513
(58) Field of Classification Search ................ 420/441, 420/590; 148/513

See application file for complete search history.

(56) References Cited

U.S. PATENT DOCUMENTS

| 4,661,317 | A | * | 4/1987 | Bardenheuer | 420/434 |
| 4,946,646 | A | * | 8/1990 | Gamo et al. | 420/415 |
| 6,322,926 | B1 | * | 11/2001 | Kasashima et al. | 429/218.2 |
| 6,491,866 | B1 | * | 12/2002 | Ovshinsky et al. | 420/402 |

FOREIGN PATENT DOCUMENTS

| JP | 62015760 | 6/1987 |
| JP | 4079159 | 6/1992 |
| JP | 5195007 | 8/1993 |
| JP | 8170129 | 7/1996 |

* cited by examiner

*Primary Examiner*—Daniel Jenkins
(74) *Attorney, Agent, or Firm*—Buchanan Ingersoll PC

(57) ABSTRACT

The invention concerns a method of improving the properties of a hydrogen storage alloy powder for a negative electrode of a rechargeable nickel hydride battery. The method comprises the steps of hydriding a powdered alloy starting material, oxidizing the obtained hydride alloy powder and washing the oxidized powder. The invention also concerns the obtained powder.

16 Claims, 2 Drawing Sheets

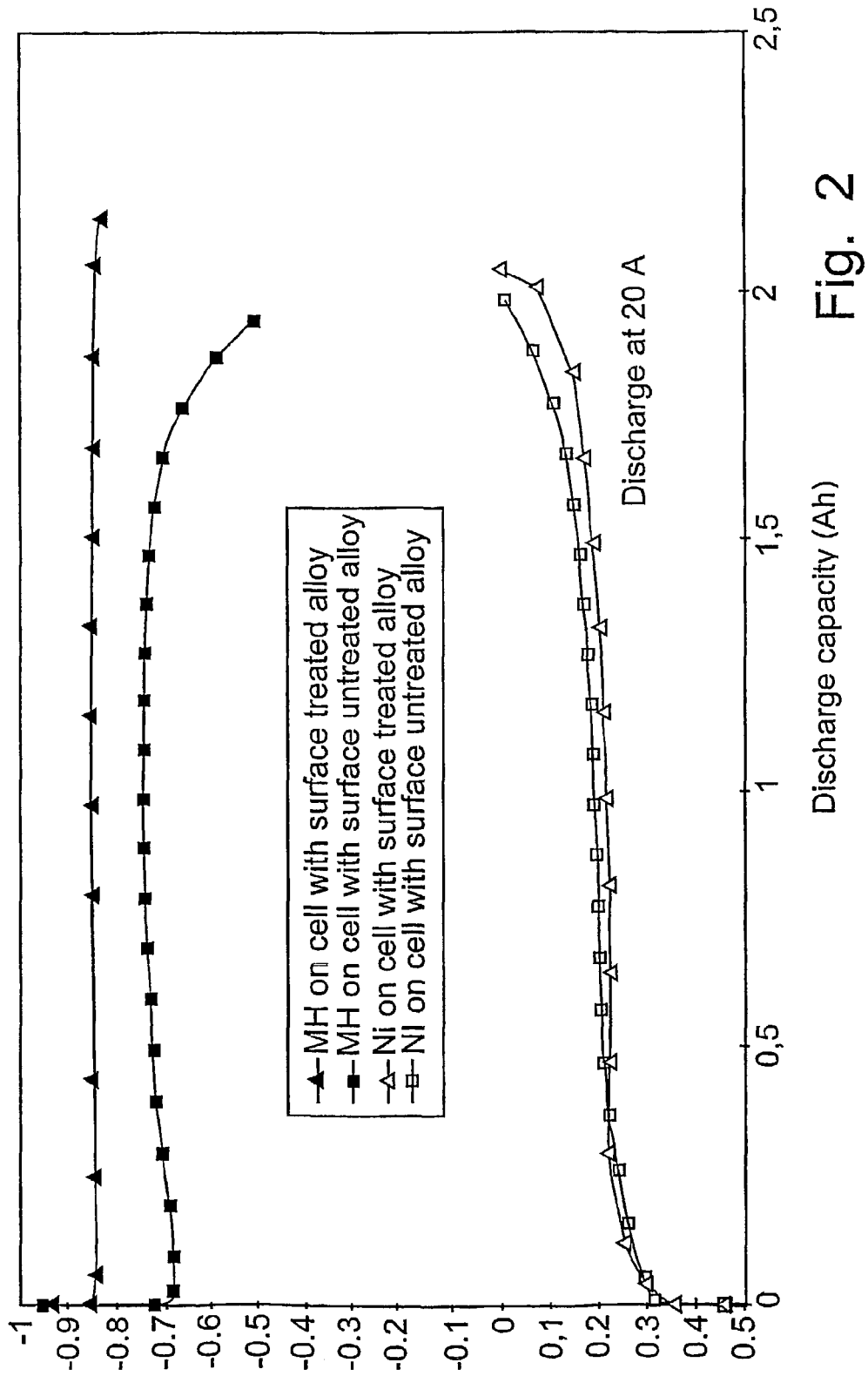

METHOD FOR IMPROVING THE PROPERTIES OF ALLOY POWDERS FOR NIMH BATTERIES

FIELD OF THE INVENTION

Figure 1:
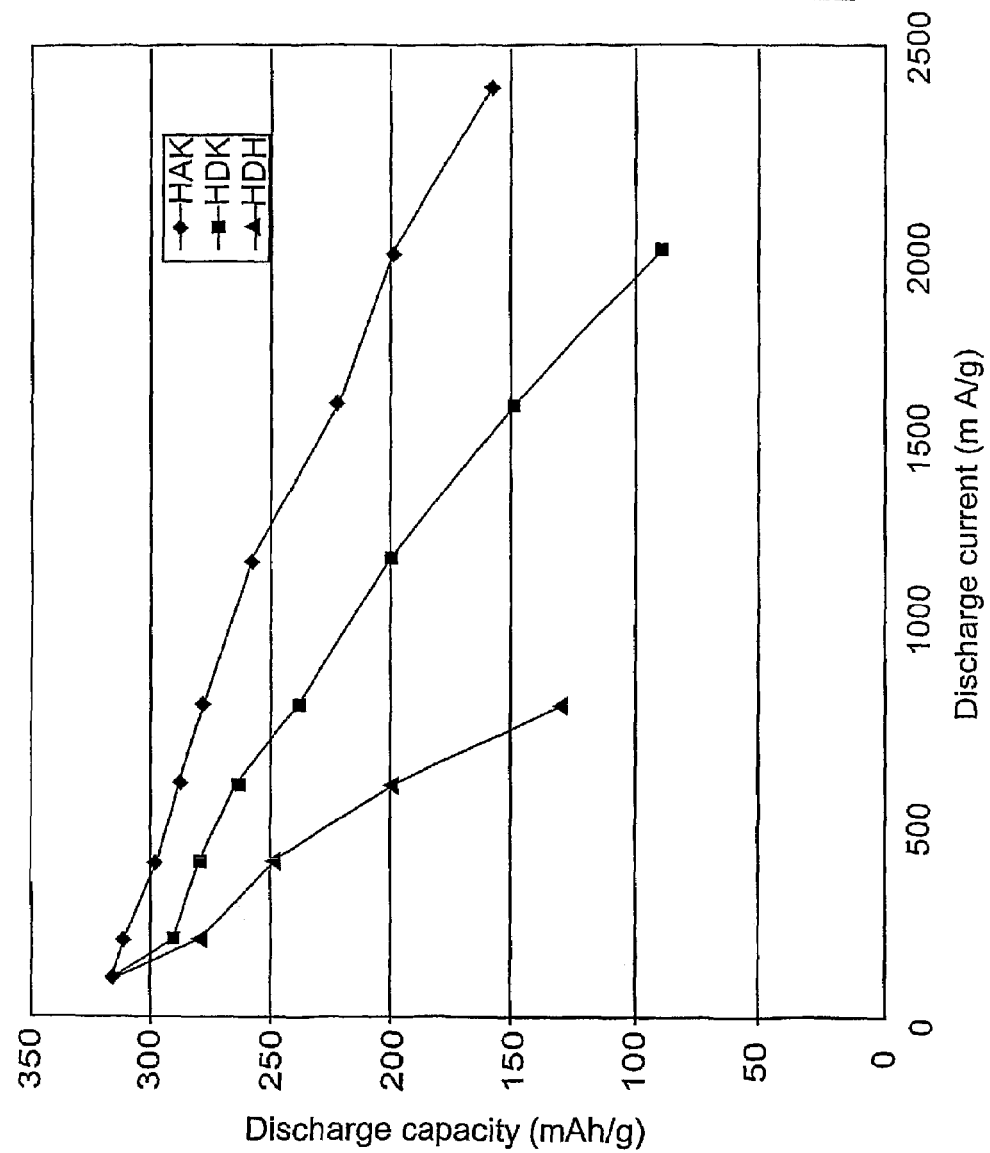

The present invention concerns a method for improving the properties of alloy powders for rechargeable batteries. Specifically, the invention concerns a method for improving the kinetics of alloy powders for use as active material for a negative electrode of a rechargeable nickel hydride battery (NiMH). The invention also concerns the improved alloy powder obtained by the method.

BACKGROUND OF THE INVENTION

Ni-MH batteries are widely used in portable computers, cellular phones and new cordless appliances. It also has a bright prospect for being utilised as, a high performance battery for electrical vehicles (EV), hybride electric vehicles (HEV) and different tools because of its high energy density, high rate capability, long cycle life and environment friendly properties. For the application of Ni-MH battery in vehicles and tools it is necessary to further develop the fast charging and discharging kinetics in a wide temperature range. Efforts have been made in order to improve the electro-chemical charge and discharge kinetics of metal hydride electrode by surface treatments or AB-element substitution. Another alternative has been to vary the stoichiometry.

The present invention is based on the finding that unexpectedly improved properties of rechargeable nickel hydride batteries can be obtained by a new surface treatment method.

SUMMARY OF THE INVENTION

In brief the method of improving the properties includes the steps of hydriding a powdered alloy starting material by exposing the material to hydrogen, oxidising the obtained hydride alloy powder and washing the oxidised powder.

By using the method according to the invention a new hydrogen storage alloy powder, the particles of which have an increased active specific surface area, is obtained.

The new alloy powder is suitable for the manufacture of batteries having good rate capability, low heat effect and a similar discharge performance during a continuous discharge and interval discharge.

DETAILED DESCRIPTION OF THE INVENTION

The alloy starting material could be an ingot material or an atomised powder such as a gasatomised powder. The alloy starting material may also be melt spun.

The alloy used may be an alloy of the so-called $AB_5$ type although it is believed that also other types of alloys with higher A metal content such as $AB_3$, $AB_2$ and AB may be used. Here, A is a strong hydride-forming metal from the left of the periodic table such as La, Ti, Zr etc. and B is a non or weakly hydride-forming metal to the right of the table such as Ni, Fe, Al, Mn, Cu etc. The $AB_5$ alloys have a $CaCu_5$ type of crystal structure and usually have the following composition: $Mm(Ni,Co,Al,Mn)_5$ wherein Mm denotes mischmetal. The mischmetal is a mixture of rare earth elements predominantly La, Ce, Nd and Pr etc. The internal ratio of the different rare earth metals is usually dependent on the source of the ore from which they are extracted. It has been found that the presently used, La rich, standard $AB_5$ alloys are suitable starting material for the method according to the invention.

By exposing the obtained alloy to hydrogen a hydride powder is obtained. The hydriding process may be performed in a closed container/vessel in the presence of essentially pure hydrogen gas. The period for this treatment may be decided experimentally in view of the alloy composition, the grain size, the desired final properties of the battery etc. At present we believe that this period may vary between a few minutes and up to several hours depending on the initial size of the starting material. The temperature may vary between room temperature and 400° C.

The oxidation step, which is a critical step in the process of the preparation of the new powder according to the invention, may be performed in air after the completion of the hydriding step. Alternatively, the oxidation step is performed essentially simultaneously with the hydriding step. Such a combined hydriding and oxidation step is preferably performed in moist hydrogen gas under controlled conditions due to the risk of igniting the powder. It is also possible to use an oxygen-hydrogen mixture if the oxygen content is kept well below the limits for explosion. The oxidising treatment will give the final alloy powder an oxygen content of more then 0.2 wt % or 2000 ppm, which is well above the maximum limit of oxygen content in the alloy, set by the specifications of the present battery producers to be 500–1500 ppm.

Also the third final washing step is critical in order to get the improved reaction kinetics on the powder surfaces. The washing step without the oxidation step does not give the improved effect, which has been observed according to the present invention.

Additionally, experiments performed with alloy powders, which have not been subjected to the hydriding step have resulted in alloy powders demonstrating inferior results when tested in batteries. Such a process is disclosed in e.g. the abstract of JP 62015760.

Accordingly the combination of the three steps is necessary in order to get the improved properties of the alloy powders according to the invention.

The oxidation and washing processes create an enlarged surface containing a magnetic species which is evidenced by the fact that the obtained powder is magnetic, whereas the untreated powder is paramagnetic. Other characterising features of the new alloy powders are an enlarged active surface area, as measured with a BET instrument, of above about 0.5 $m^2/g$, preferably above 0.8 and most preferably above about 1 $m^2/g$ which surface is magnetic. Furthermore, it has been found that at least 80, often at least 90% of the alloy particles will get an average particle size larger than 5 microns, which is valuable as too small particles give rise to e.g. corrosion problems. An increased surface is always possible to obtain by milling but the inventive method provides a powder with an increased surface area while the particle size or grain size is comparatively large.

As the obtained powder is sensitive to further oxidation and moisture it is preferably stored at low temperature in the absence of oxygen.

The invention is further illustrated by the following non limiting examples.

Alloys of the present invention were produced in the following steps:

An alloy with a standard composition $MmNi_{3.6}Co_{0.7}Mn_{0.4}Al_{0.3}$ made by conventional casting was studied. Both mechanical grinding and HDH (hydriding and dehydriding) were used to pulverise the alloy. Some alloy powder samples were surface-treated by preoxidisation and a subsequent boiling in a KOH solution according to the invention. The specific surface area for the untreated powder was 0.16 $m^2/g$ and the specific surface area for the treated powder was 1.16 $m^2/g$. It was also observed that the untreated powder was paramagnetic whereas the powder treated according to the inventive method was magnetic.

Hydride electrodes for the half-cell test were made by mixing one part(0.15 g) of alloy powder with three parts of copper powder (200 mesh) and the mixture was pressed to a pellet with 1 cm diameter under 4 kbar. The pellet was covered by nickel net (100 mesh) and pressed again under a similar pressure and was then spot-welded to a nickel wire for a electrical connection. A 6 M KOH electrolyte was used in the half-cell test. After 20 charge/discharge activation cycles, the discharge capacity at different currents was measured for a fully charged electrode. The cut-off potential of the hydride electrode was set to −0.6 V with respect to a Hg/HgO reference electrode. In order to study changes in rate capability during cycling, this measurement was repeated after each 50 cycles for a selected number of electrodes. During cycle-life testing the electrodes were cycled by charging for 90 min at 200 mA/g and discharged for 70 min. at 200 mA/g. The discharge rate capability of an electrode with surface-treated alloy was also tested at different temperatures. The charge rate capability was characterised by charging the electrode, at different currents, to 100% and 90% of maximum capacity. Then the discharge capacity was measured at a 100 mA/g rate.

Cells used in this work were of a sub-C type and the electrodes were made by a dry-powder method as described in J. Electrochem. Soc. 142 No 12 (1995) 4045 which is hereby incorporated by reference. The batteries have about 15 g alloy powder and 6 g of a 6M KOH+1M LiOH electrolyte. The nominal capacity of the cells were 2.3 Ah. The cells were activated by 0.1 C charging for 15 hours and 0.2 C discharging to 1V in the first cycle, charging for 7,5 hours at 0.2 C and discharging at 0.5 C to 1V in the second cycle and then charging at 0.5 C for 2.8 hours and discharging at 0.5 C to 1V for the remaining cycles. Discharge curves were measured with different discharge currents after the cell being charged at 0.5 C for 2,8 hours and rested for 0.5 hour. The cut-off voltage was selected to 1V for the 1 C rate to 0.6V for the 10 C rate. Interval discharge performances for some batteries were measured by using a 1 min discharge and 30 min rest to avoid effects of heating the cells at high rate. In order to check the discharge potential of the electrodes, a fully charged battery was opened by removing the safety vent and then flooded with electrolyte. A Hg/HgO electrode was connected by means of a capillary completely filled with electrolyte.

FIG. 1 shows results from half-cell measurements with the new preoxidised and washed material according to the present invention. The performance in FIG. 1 was reached after a trial and error optimisation procedure, varying the exposure time to air and the subsequent hot washing in KOH. Optimal results were obtained after leaving a thin layer of hydride exposed in air at room temperature for 7 days and subsequently washing the hydride in a hot (90° C.) 6M KOH solution for 1.5 hour. In the figure the process according to the present invention is called the HAK treatment after Hydriding, exposure to Air and subsequently treating in hot KOH. The reactions of the HAK method may be summarised as follows:

1. Hydridizing alloy

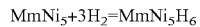

2. Oxidation of the hydride

3. KOH treatment

After washing with pure water and drying in acetone the amount of nickel or nickel alloy precipitated during the HAK treatment had made the alloy powder so magnetic that it could be lifted with a small permanent magnet. This is in contrast to the initial alloy which is paramagetic.

In the figure the resulting kinetics after only hydriding and dehydriding (HDH) and hydriding/dehydriding and washing in hot KOH (HDK) are included for comparison. The figure clearly demonstrates the improvements obtained with the inventive method.

In a sealed cell the advantages of the treatment can be seen when discharging cell with a reference electrode inserted. This allows for observing the potential of both electrodes during the discharge. In FIG. 2 the discharge curves from a cell with one treated hydride are superimposed upon the curves from a cell with a standard untreated alloy. As can be seen the potential curves from nickel electrode are rather similar. The discharge curves from the metal hydride electrode show quite different behaviour for the two cells. The polarisation (and thus the electrical losses incurred) of the electrode with the treated alloy is substantially smaller than that of the electrode with an untreated alloy. Furthermore, the electrode with treated alloy exhibits a close to ideal behaviour during the whole of the discharging.

The invention claimed is:

1. A method of improving the properties of a hydrogen storage alloy powder for a negative electrode of a rechargeable nickel hydride battery comprising the steps of hydriding a powdered alloy starting material having the composition Mm (Ni, Co, Al, Mn)$_5$ wherein Mm denotes misch metal by exposing the material to hydrogen, oxidising the obtained hydride alloy powder, and washing the oxidised powder.

2. Method according to claim 1 wherein the alloy starting material is a hydrogen storage alloy in the form of ingots, atomised powders, rapid cooled flakes or melt spun ribbons.

3. Method according to claim 2 wherein the alloy starting material is a gasatomised powder.

4. Method according to claim 1 wherein the hydriding is performed by exposing the alloy powder to essentially pure hydrogen.

5. Method according to claim 1 wherein the oxidation step is performed by exposing the alloy powder to air.

6. Method according to claim 1 wherein the oxidation step is performed by exposing the alloy powder to a mixture of hydrogen and oxygen.

7. Method according to claim 1 wherein the washing step is performed with an alkali solution.

8. A method of improving the properties of a hydrogen storage alloy powder for a negative electrode of a rechargeable nickel hydride battery comprising the steps of hydriding a powdered alloy starting material by exposing the material to hydrogen, oxidising the obtained hydride alloy powder wherein the oxidation step is performed essentially simultaneously with the hydriding step in moist hydrogen, and washing the oxidised powder.

9. Method according to claim 8 wherein the alloy starting material is a hydrogen storage alloy in the form of ingots, atomised powders, rapid cooled flakes or melt spun ribbons.

10. Method according to claim 8 wherein the alloy starting material is a gasatomised powder.

11. Method according to claim 8 wherein the alloy starting material is a hydrogen storage alloy of a composition between AB and AB$_6$.

12. Method according to claim 8 wherein the alloy starting material is a hydrogen storage alloy composition of the $AB_5$ type.

13. Method according to claim 8 wherein the oxidation step is performed by exposing the alloy powder to air.

14. Method according to claim 8 wherein the oxidation step is performed by exposing the alloy powder to a mixture of moist hydrogen and oxygen.

15. Method according to claim 8 wherein the washing step is performed with an alkali solution.

16. Method according to claim 8 wherein the alloy starting material has the following composition: $Mm(Ni, Co, Al, Mn)_5$, wherein Mm denotes misch metal.

* * * * *

UNITED STATES PATENT AND TRADEMARK OFFICE
CERTIFICATE OF CORRECTION

| | | |
|---|---|---|
| PATENT NO. | : 7,056,397 B2 | Page 1 of 1 |
| APPLICATION NO. | : 10/275158 | |
| DATED | : June 6, 2006 | |
| INVENTOR(S) | : Dag Noreus et al. | |

It is certified that error appears in the above-identified patent and that said Letters Patent is hereby corrected as shown below:

On the title page item
(73)Assignee:

"Höganäa AB, Höganäa AB (SE)" should read -- Höganäs AB, Höganäs (SE)--.

Signed and Sealed this

Eighth Day of August, 2006

JON W. DUDAS
*Director of the United States Patent and Trademark Office*